June 19, 1923.

C. R. CROSNO

PRESSURE GAUGE

Filed Nov. 23, 1920

Inventor
C. R. Crosno,
By William C. Linton
Attorney

June 19, 1923.
C. R. CROSNO
1,459,014
PRESSURE GAUGE
Filed Nov. 23, 1920
2 Sheets-Sheet 2
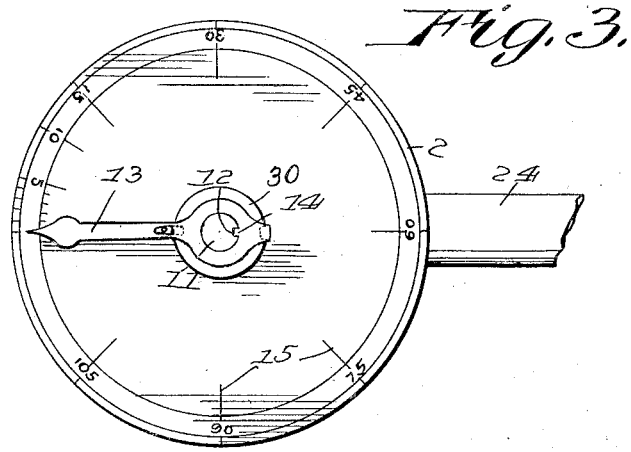
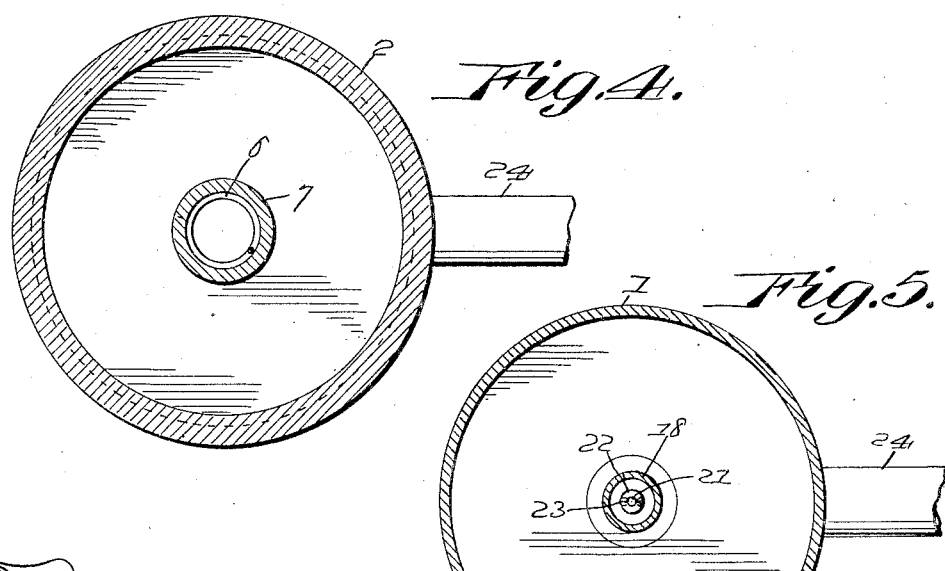
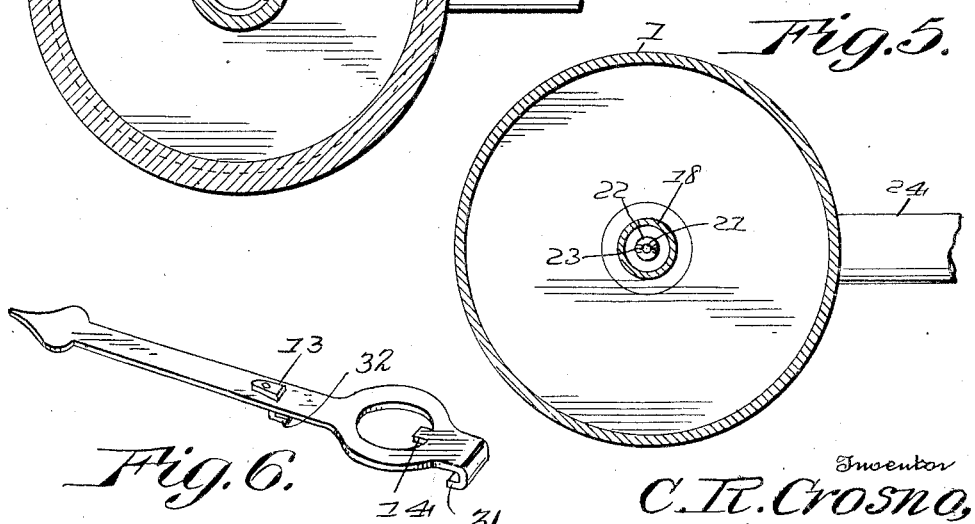

Patented June 19, 1923.

1,459,014

UNITED STATES PATENT OFFICE.

CHARLES R. CROSNO, OF ALBUQUERQUE, NEW MEXICO.

PRESSURE GAUGE.

Application filed November 23, 1920. Serial No. 426,062.

*To all whom it may concern:*

Be it known that I, CHARLES R. CROSNO, a citizen of the United States and a resident of Albuquerque, county of Bernalillo, and State of New Mexico, have invented certain new and useful Improvements in Pressure Gauges; and I do hereby declare that the following is a full, clear, and exact description of the invention, such as will enable others skilled in the art to which it appertains, to make and use the same.

This invention has reference to improvements in pressure gauges for use in the inflation of pneumatic tires, having for its principal object to provide an automatic tire inflating gauge which upon inflation of a pneumatic tire to the desired pressure, will serve as an automatic cut-off between such tire and the source of air supply therefor, hence, preventing over-inflation of the tire together with those detrimental results caused by such condition.

It is also an object of this invention to provide an improved gauge with a pressure control valve settable to a predetermined point and operable upon the reaching of said predetermined point whereby to immediately discontinue connection as between the tire being inflated and the source of air supply, the valve being settable to various points, such as conditions or preference may dictate.

Other objects of the invention will be in part obvious and in part pointed out hereinafter.

In order that the invention and its mode of operation may be readily understood by persons skilled in the art, I have in the accompanying illustrative drawings and in the detailed following description based thereon, set out one practical embodiment of the invention.

In these drawings:

Figure 3 is a top plan view of the gauge;

Figure 4 is a horizontal section taken on the line 4—4 of Figure 2;

Figure 5 is a similar section taken on the line 5—5 of Figure 2;

Figure 6 is a detail and perspective view of the indicator employed;

Figure 1:
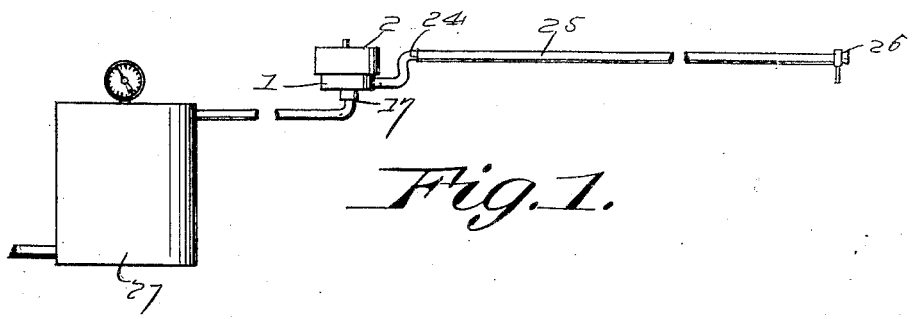
Figure 1 is a side elevation of my improved air pressure gauge as connected to a conventional type of tire inflating apparatus.
Figure 2:
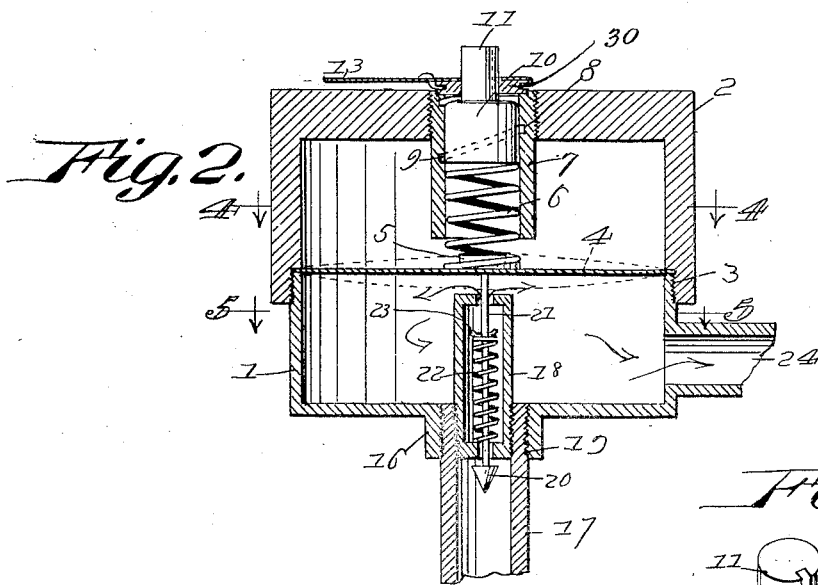
Figure 2 is an enlarged vertical section through the gauge.
Figure 7:
Figure 7 is a corresponding view of the type of valve employed.
Figure 8:
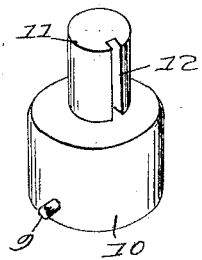
Figure 8 is a detail and perspective view of the movable head for effecting connection between the indicator and the gauge diaphragm.

Having more particular reference to the drawings, in connection with which like characters of reference will designate corresponding parts throughout the several views, the gauge comprises a casing composed of sections 1 and 2, the adjoining or adjacent portions of which are internally and externally screw threaded as at 3 whereby to permit of the joining thereof as shown in the Figure 2. Interposed between the connection 3 of the casing sections 1 and 2, is a circular diaphragm 4 carrying concentrically of itself a stud 5 on which the lower end of the coil spring 6 rests, the upper portion of said spring extending into a circular sleeve 7 having a spiral groove or way 8 formed therein receiving a finger 9 carried on the lower end of the movable head 10, which head, as will be noted, is snugly received in the upper portion of the sleeve 7 and has its upper extremity reduced as at 11 and longitudinally slotted at 12, whereby to permit of connection of an indicator 13 therewith. This indicator 13, as will be noted, is provided with an inwardly extending finger 14, which finger enters the groove 12 and, as will be understood, serves to effect connection between the same and the movable head 10 so that with rotation of the indicator, corresponding movement of the head 10 will be caused. In order to effect positive connection between the indicator 13 and the reduced extremity 11, whereby rotation of such indicator with the movable head 10 will be insured, I may and preferably do fixedly mount upon this extension a concentric disk 30 having a peripheral groove formed thereabout and in which the annular fingers or cleats 31 and 32 are engaged, as shown in the Figures 2 and 6. In this connection, it is to be noted that the finger 31 is formed on the inner end of the indicator 13 by bending a portion of the same downwardly and inwardly at substantially right angles, while the finger 32, in this particular embodiment, is shown as being attached to the intermediate portion of the indicator although, of course, it is to be understood that the same, if desired, may be formed integrally therewith. By so connecting or mounting the indicator 13 upon the reduced extremity 11, binding of the movable head 10, due to rotation of such indicator to a predetermined point upon the graduated dial or face of the casing, will be prevented, since the disk 30 has bearing in an annular seat formed in the upper marginal portion of the sleeve 7. However, sliding movement of the head within the sleeve and with relation to the disk will be permitted due to the engagement of the finger 14 in the groove 12. The face or upper side of the casing section 2 is provided with graduations generally indicated by the numeral 15, these graduations serving to indicate various pressures to which the gauge will respond.

The casing section 1 is formed with an internally screw threaded nipple 16 and receives therein a conduit 17, also internally screw threaded, and having turned into engagement therewith a secondary casing or sleeve 18, the upper and lower ends of which are provided with ports 19. A reciprocal conical valve 20 is associated with the sleeve 18 having the stem 21 thereof passing over the alined ports 19, while a coil spring 22 is arranged about that portion of the stem 21 within the sleeve having one end thereof bearing upon the lower end of said sleeve, while its remaining end is engaged with a stop, such as a cotter pin 23, in order that the conical valve 20 will be normally maintained in closed position with relation to its seat over the lowermost port 19.

As shown in the Figure 2, the upper or inner end of the valve stem 21 has bearing upon the lower side of the diaphragm 4 adjacent the arrangement of the stud 5 on the upper face thereof, and in consequence, the diaphragm 4 will be, in the absence of air pressure or pressure of the spring 6, maintained in its neutral position as shown in full lines in Figure 2.

A conduit 24 extends from one side of the casing section 1 and, if desired, may have the usual form of flexible conduit 25 connected therewith, which conduit carries on its outer end a suitable form of valve connection 26. The conduit 17, of course, serves as the air inlet for the gauge, and in turn is connected to an air reservoir 27 of any conventional or suitable design.

Operation of my improved gauge may be reviewed as follows:

Assuming that the tires are to be inflated by an apparatus equipped with my improved type of pressure gauge to a pressure of approximately seventy-five pounds, the indicator 13 is rotated to a point adjacent that graduation 15 designative of seventy-five pounds of pressure. With such rotary movement of the indicator 13 the movable head 10 will be also rotated in the sleeve 7, and by consequence, the coil spring 6 will be compressed and thus exert a downward thrust upon the diaphragm 4, flexing the same to the dotted line position in Figure 2. Air now flows from the storage tank or reservoir 27 through the conduit 20 and the ports 19 of the sleeve 18 through the gauge casing and outwardly therefrom through the conduit 24 into the tire having connection with the flexible hose 25. As the pressure of air discharged into the tire gradually increases, the back pressure therefrom will be directed onto the lower side of the diaphragm 4 and will gradually force the same upwardly. Thus, when seventy-five pounds of pressure have been attained in the tire, the back pressure of air in the gauge casing will be such as to move the diaphragm 4 to its uppermost position shown in dotted lines in the Figure 2, and when in such position, the spring 22 will act upon the conical valve 20 to move the same to a closed position with relation to the lowermost port of the ports 19 of the sleeve 18, thereby discontinuing the passage of air from the reservoir 27 to the tire, and preventing over-inflation of the latter. With removal of the connection 26 from the valve of the tire, the back pressure in that chamber of the gauge casing, constituted by the lower section 1 and the diaphragm 4, will be relieved, and in consequence, the gauge will be then ready for further inflation of tires to seventy-five pounds air pressure, or any other pressure to which the indicator 13 may be subsequently adjusted.

Manifestly, the construction shown is capable of considerable modification, and such modification as is within the scope of my claims, I consider within the spirit of my invention.

I claim:

1. A tire inflating pressure gauge comprising a casing having an upper and lower section, a diaphragm interposed between said sections, an integral stud formed concentrically with the upper face of said diaphragm, an inlet and outlet port arranged in the lower section of said casing, a valve for said inlet port and arranged therein, means for operatively connecting said valve with the lower face of said diaphragm, an interiorly projecting sleeve carried by the said upper section of the casing and concentrically thereof, said sleeve having spiral grooves on its inner periphery, a rotatable head slidably carried in said sleeve, a reduced shank formed with said head, a pin carried by said head and adapted to travel within said groove whereby a vertical movement is imparted to said head upon rotation thereof, a coil spring arranged within said sleeve between said head and diaphragm, said stud of the diaphragm projecting within the lower end of the spring to prevent displacement of the latter, a graduated dial arranged upon the upper face of said casing and an indicator carried by the reduced shank of said head and adapted to be moved to a predetermined point whereby the diaphragm is placed under a predetermined pressure through action of the coil spring substantially and in the manner described.

2. A tire inflating pressure gauge comprising a casing, having an upper and lower section, a diaphragm interposed between said sections, the said lower section having an inlet and outlet port arranged therein, a spring actuated valve positioned within said inlet port, a stem carried by said valve, said stem having engagement with said diaphragm for operatively connecting the valve to the latter, a sleeve carried by the upper section of said casing and extending therein, a spiral groove in the inner face of said sleeve, a movable head rotatably and slidably mounted within said sleeve, a finger carried by said head adjacent the lower end thereof, said finger extending within said groove whereby said head will move in a vertical direction upon rotation thereof, a reduced shank formed with the upper end of said head, said shank having a vertical slot, a disc carried by said shank, said disc having a peripheral flange formed therewith, an indicator carried by said reduced shank and disposed upon said disc, a finger formed integrally with said indicator, extending within said slot, a graduated dial provided upon the upper surface of said casing, guide cleats formed with said indicator for engagement with the peripheral flange of said disc and a coil spring disposed interiorly of said sleeve engaging the lower end of said head and the upper face of the diaphragm, said indicator being adapted to be rotated over said dial to a predetermined point when the diaphragm is placed under a predetermined pressure substantially as described.

CHARLES R. CROSNO.